US008856771B2

(12) United States Patent
Chalmers et al.

(10) Patent No.: US 8,856,771 B2
(45) Date of Patent: Oct. 7, 2014

(54) PROTECTION FOR UNAUTHORIZED FIRMWARE AND SOFTWARE UPGRADES TO CONSUMER ELECTRONIC DEVICES

(75) Inventors: Diane Christine Chalmers, Rochester, MN (US); Nixon Cheaz, Cary, NC (US); David Michael Stecher, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 13/213,281

(22) Filed: Aug. 19, 2011

(65) Prior Publication Data

US 2013/0047143 A1    Feb. 21, 2013

(51) Int. Cl.
   G06F 9/44     (2006.01)
   G06F 21/57    (2013.01)
   G06F 9/445    (2006.01)

(52) U.S. Cl.
   CPC .............. *G06F 21/572* (2013.01); *G06F 8/61* (2013.01); *G06F 8/65* (2013.01); *G06F 8/60* (2013.01)
   USPC ............ 717/168; 717/171; 717/172; 717/173

(58) Field of Classification Search
   CPC .............. G06F 8/60; G06F 8/61; G06F 8/65; G06F 8/67; G06F 8/68; G06F 8/71; G06F 11/1433; H05L 29/06; H05L 29/08072; H05L 29/08981
   USPC ......................................................... 717/168
   See application file for complete search history.

(56) References Cited

U.S. PATENT DOCUMENTS

| | | | |
|---|---|---|---|
| 5,881,236 A * | 3/1999 | Dickey .......................... | 709/221 |
| 5,926,624 A | 7/1999 | Katz et al. | |
| 6,092,194 A * | 7/2000 | Touboul ........................ | 726/24 |
| 6,965,674 B2 | 11/2005 | Whelan et al. | |
| 8,296,579 B2 * | 10/2012 | Piwonka et al. .............. | 713/189 |
| 2001/0013121 A1 | 8/2001 | Kimball et al. | |
| 2002/0183056 A1 * | 12/2002 | Lundblade et al. ........... | 455/425 |
| 2003/0061401 A1 | 3/2003 | Luciani, Jr. | |
| 2003/0217193 A1 | 11/2003 | Thurston et al. | |
| 2005/0108700 A1 | 5/2005 | Chen et al. | |
| 2007/0112773 A1 | 5/2007 | Joyce | |
| 2007/0192854 A1 * | 8/2007 | Kelley et al. .................... | 726/22 |

(Continued)

OTHER PUBLICATIONS

Wikipedia; "Checksum" retrieved from http://en.wikipedia.org/wiki/Checksum on May 25, 2011.

(Continued)

*Primary Examiner* — Qing Chen
*Assistant Examiner* — Andrew M Lyons
(74) *Attorney, Agent, or Firm* — Robert H. Frantz; Jeffrey S. LaBaw

(57) ABSTRACT

A firmware or software update, patch, or upgrade image is authenticated by forcing its checksum to match a pre-determined value. The pre-determined value is known by a consumer electronic device in advance of propagating the image for installation. Upon propagation, the device determines a checksum value of the received imaged, and compares the checksum value to the pre-determined expected authenticity value. If they match, the image is installed. In an optional feature, the image is executed by the device and modifies the pre-determined checksum value to a next value, which is also shared or known by the image server. In this variation, no two images have the same expected value, and unauthorized images may be rejected for installation.

9 Claims, 6 Drawing Sheets

(56) References Cited

U.S. PATENT DOCUMENTS

| | | | |
|---|---|---|---|
| 2007/0300207 A1* | 12/2007 | Booth et al. | 717/126 |
| 2008/0052699 A1 | 2/2008 | Baker et al. | |
| 2008/0148409 A1 | 6/2008 | Ampunan et al. | |
| 2008/0244553 A1* | 10/2008 | Cromer et al. | 717/168 |
| 2009/0144455 A1 | 6/2009 | Chen | |
| 2009/0172639 A1* | 7/2009 | Natu et al. | 717/120 |
| 2010/0121965 A1* | 5/2010 | Chatterjee | 709/229 |
| 2012/0030731 A1* | 2/2012 | Bhargava et al. | 726/3 |
| 2013/0047144 A1 | 2/2013 | Chalmers | |

OTHER PUBLICATIONS

Wikipedia; "Digital signature" retrieved from http://en.wikipedia.org/wiki/Digital_signature on May 25, 2011.

Wikipedia; "iOS jailbreaking" retrieved from http://en.wikipedia.org/wiki/IOS_jailbreaking on May 25, 2011.

Yahoo Answers; "What is custom firmware?" retrieved from http://in.answers.yahoo.com/question/index?qid=20090324225920AAKAvY0 on May 25, 2011.

wired.com; "The New HD-DVD/Blu-Ray Hack: What it might Mean for Us"; retrieved on Jul. 19, 2011 from http://www.wired.com/gadgetlab/2007/02/the_new_hddvdbl/.

unixwiz.net; "Steve Friedl's Unixwiz.net Tech Tips: An Illustrated Guide to Cryptographic Hashes"; retrieved on May 26, 2011 from http://www.unixwiz.net/techtips/iguide-crypto-hashes.html.

CS; "Herding Hash Functions and Nostradamus Attack"; retrieved on May 26, 2011 from http://www.cs.washington.edu/homes/yoshi/papers/EC06/herding.pdf.

Schneier; "Schneier on Security: Cryptanalysis of SHA-1" retrieved on May 26, 2011 from http://www.schneier.com/blog/archives/2005/02/cryptanalysis_o.html.

Sotirov; "MD5 considered harmful today"; retrieved on May 26, 2011 from http://www.win.tue.nl/hashclash/rogue-ca/.

sqlservercentral.com; "Row checking with checksum"; retrieved on May 26, 2011 from http://www.sqlservercentral.com/Forums/Topic541679-49-1.aspx#bm561112.

Wikipedia; "Checksum"; retrieved on Jul. 19, 2011 from http://en.wikipedia.org/wiki/Checksum.

Wikipedia; "MD5"; retrieved on Jul. 19, 2011 from http://en.wikipedia.org/wiki/MD5.

Wikipedia; "SHA-2"; retrieved on Jul. 19, 2011 from http://en.wikipedia.org/wiki/SHA-2.

zdnet.com; "Hooray! Blu-ray BD+ hacked!" retrieved on Jul. 19, 2011 from http://www.zdnet.com/blog/storage/hooray-blu-ray-bd-hacked/306.

USPTO; Examination Correspondence from a Related U.S. Appl. No. 13/213,355; filed on Aug. 19, 2011 by Diane C. Chalmers.

USPTO; Examination Correspondence from a Related U.S. Appl. No. 13/213,355; filed on Aug. 19, 2011 by Diane Christine Chalmers.

USPTO; Examination Correspondence from a Related Patent Application(Office Action 1), U.S. Appl. No. 13/213,355; filed on Aug. 19, 2011 by Diane Christine Chalmers.

USPTO; Examination Correspondence from a Related Patent Application(Office Action 1 Reply), U.S. Appl. No. 13/213,355; filed on Aug. 19, 2011 by Diane Christine Chalmers.

* cited by examiner

PROTECTION FOR UNAUTHORIZED FIRMWARE AND SOFTWARE UPGRADES TO CONSUMER ELECTRONIC DEVICES

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

None.

MICROFICHE APPENDIX

Not applicable.

INCORPORATION BY REFERENCE

None.

FIELD OF THE INVENTION

The invention generally relates to systems, methods, and computer program products to prevent unauthorized upgrades or patches to firmware and software of electronic systems.

BACKGROUND OF INVENTION

It is commonplace for processor-based consumer electronic devices to be equipped with embedded software for firmware which can receive an update image and install that update image into itself. Such consumer electronic devices include, but are not limited to, personal computers, tablet computers, "smart phones", cellular telephones, cable television decoder boxes, alarm control panels, scientific calculators, graphing calculators, global positioning navigation systems, digital music players, game consoles, handheld or portable game devices, "smart board" educational and presentation displays, and so forth.

Many of these systems are "open" in that their manufacturers publish interfaces to the software so that third-party companies may provide additional features and software modules for those systems. However, this can lead to quality, dependability, and supportability issues as the system configurations can become unstable and no one vendor can provide full support for all installed options and modules.

Another approach is for the manufacturers of these types of systems to provide them in a "closed" architecture, which means they do not generally publish the software interfaces and mechanisms to install software options and modules. Instead, they control the sources and modules to only include those which come from the manufacturer themselves, or third-party modules which have been fully verified for performance, supportability and suitability by the manufacturer.

There are many challenges to keeping systems "closed", while there are many "hackers" who wish to thwart the mechanisms in the closed systems which prevent their being open systems.

SUMMARY OF THE INVENTION

A firmware or software update, patch, or upgrade image is authenticated by forcing its checksum to match a pre-determined value. The pre-determined value is known by a consumer electronic device in advance of propagating the image for installation. Upon propagation, the device determines a checksum value of the received image, and compares the checksum value to the pre-determined expected authenticity value. If they match, the image is installed. In an optional embodiment feature, the image is executed by the device and modifies the pre-determined checksum value to a next value, which is also shared or known by the image server. In this variation, no two images have the same expected value, and unauthorized images may be rejected for installation.

BRIEF DESCRIPTION OF THE DRAWINGS

The several embodiments according to the present invention described herein are illustrated by the several drawings.

DETAILED DESCRIPTION OF EMBODIMENT(S) OF THE INVENTION

Figure 1:
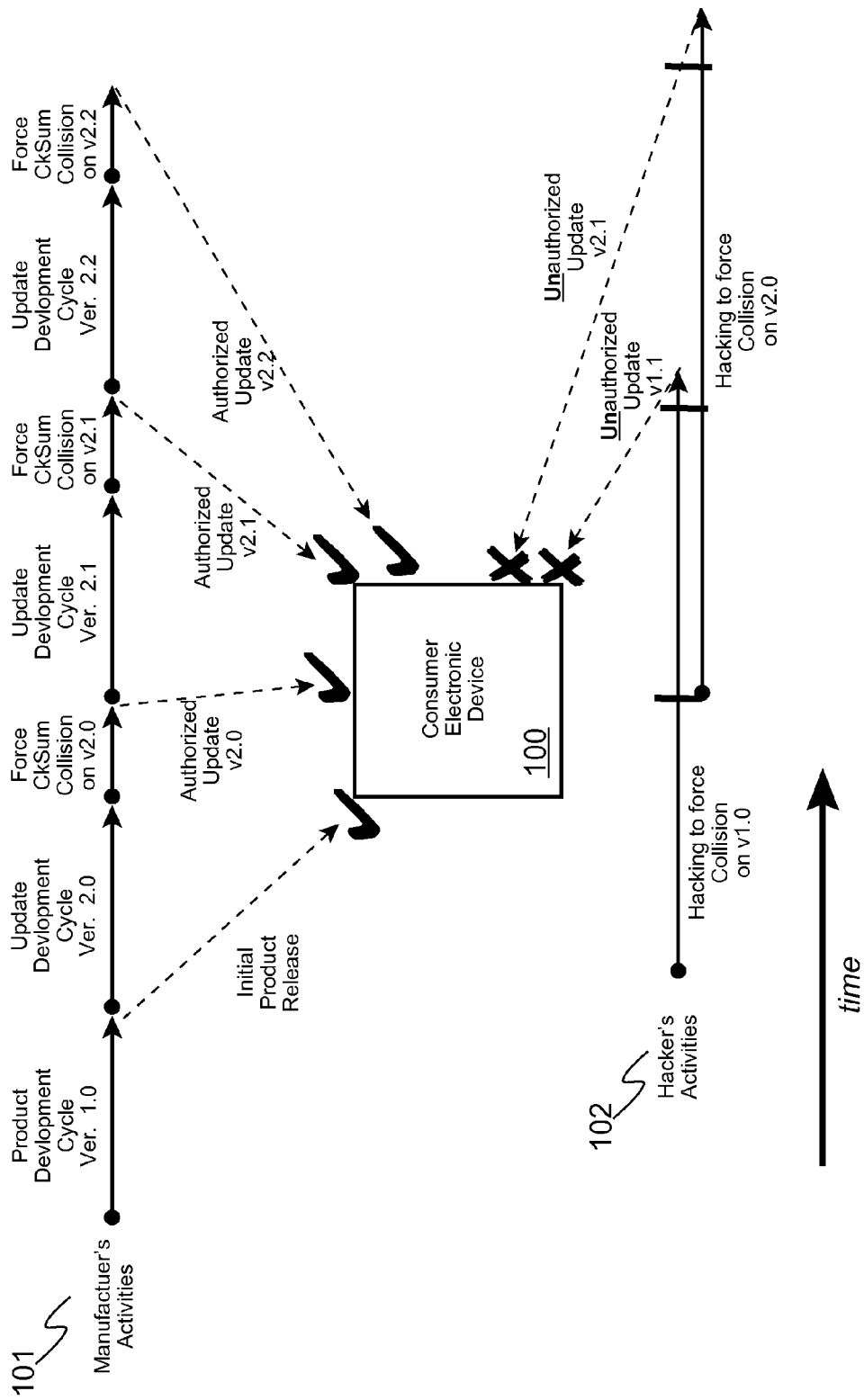
FIG. 1 provides a timeline illustration of how methods according to the present invention leverage the disparity in computational capabilities of manufacturers and hackers to achieve a closed architecture.

The inventors of the present invention have recognized a problem not yet recognized by those skilled in the relevant arts. Manufacturers of consumer electronics expend considerable resources developing devices that are intended to be "closed" systems, with security devices, processes and mechanisms in place to prevent unauthorized usage as well as unauthorized changing, upgrading or patching of the embedded software and firmware in these systems. These consumer electronic devices include, for example, cellular telephones, tablet computers, game consoles, etc.

To prevent a consumer electronic device's firmware from being hacked, manufacturers put measures in place to allow only "signed" firmware to run on the gadget. The problem with using digital signatures is that if the private key for the signature is ever leaked, the consumer electronic device will be permanently compromised, and the consumer electronic device will irreversibly become an "open" system.

Enabling Art.

Digital signatures, methods for creating and signing software images, and methods for validating (unsigning) software images are widely used in the art to restrict what firmware can be flashed into a consumer electronic device.

Checksums or "hash values" are widely known and used to increase confidence on the integrity of data images, where known checksum processes can detect specific numbers of bit-errors in an image. Often, a checksum value for a particular image is stored as the last value of the software image itself so that the checksumming process will reach a predetermined value, such as all zeros or all ones, in the final step of the process. This is a feature or characteristic of most checksumming processes-if a checksum process is seeded to a certain value X and then it is interated once more over the value X (as input), the process will yield a common value such as all zero's or all one's (e.g. F's in hexadecimal representation).

Hacking via "jailbreaking" and custom firmware are big problems for consumer electronic device manufacturers.

Disparity of Computing Power Leveraged for Temporary Security.

The inventors of the present invention first recognized that no matter how sophisticated or expensive of a signing algorithm has been applied to "closed" system designs, the value of the key, such as a public key infrastructure (PKI) key, for the authorization signature is often leaked to hackers. Once this is signing key is leaked or otherwise known, the firmware or software embedded in a consumer electronic device can be modified using unauthorized updates, patches or upgrades in order to defeat further authentication of firmware or software updates, thereby rendering the system essentially "open", risking quality control by the manufacturer, and denying the manufacturer further revenues from control of the software installed on the device.

The inventors have first recognized this aspect of the present problem, and then recognized that disparities between the computing power available to the manufacturer versus the computing power available to the ordinary hacker may be used in an advantageous manner given a new security mechanism or process. Rather than relying solely on digital signatures to sign the authorized firmware updates, a manufacturer may design a consumer electronic device so that it checks the checksum value of the firmware update against an expected checksum value before allowing it to be installed and executed. In many embodiments, "level 1" bootstrap code is immutable, programmed in a tangible memory device of the consumer electronic device in a manner which does not allow the consumer electronic device to change the bootstrap code. In other embodiments, the bootstrap code may be alterable by the device itself.

It is important to note at this point that checksums have historically only been used to check for bit errors in the firmware image. And, it is also important to note that checksum values are not historically a secret value, as they are not used traditionally for security, but rather for error detection and file integrity verification.

However, the inventors have created a new use of checksums to allow them to be used as a means to determine whether a software image is authorized or not. Software images may be customized in their digital content in order to "force" their checksum to a certain value (e.g. a hash value collision). For an effective but complex checksum, such as a Secure Hash Algorithm SHA-1 or SHA-2 checksum, considerable computing power is required to accomplish a forced checksum value, but it can be done using well known methods with industrial class computers in a reasonable amount of time. The firmware is suitably modified so that their checksum is a desired value. Then, considering that a firmware update must be propagated for several different classes of products, where "class" refers to a group of products that receive the same software updates, the computational requirements for such an update process reach far beyond the computational capabilities available to ordinary hackers using non-industrial-class computers such as home computers.

Thus, embodiments of the invention employ asymmetrical computing power in an advantageous manner, effectively denying hackers the ability to quickly hack the closed system's ability to protect itself from unauthorized firmware installations.

However, the lower-powered computers of hackers would be able to force a hash value collision over an unauthorized firmware image, but such a process with a lower-powered computer could take hundreds if not thousands of times longer than the process performed by the manufacturer with the industrial-class computers.

The inventors, therefore, employ this disparity in combination with a software update cycle which is quicker than the time period for hacking by an ordinary hacker, and the manufacturer may outpace the hacker and maintain the integrity of the protection system on the consumer electronic device.

FIG. 1 illustrates this process which leverages the computational disparity between manufacturers and hackers. In center of the diagram is the consumer electronic device (100), and the top is a timeline of manufacturer's activities (101), and at the bottom is a timeline of hacker activities (102), with time progressing from left to right. The manufacturer concludes initial product development cycle (version 1.0), and releases the device (100) into the market. Almost immediately, hacker activity will begin to try to force a checksum collision on version 1.0 in order to propagate ("jailbreak") an unauthorized version 1.1 of the firmware. Simultaneously, the manufacturer commences and completes update development cycle, and releases version 2.0 of the firmware with the forced checksum collision as shown. Because the checksum collision process is orders of magnitude faster on the manufacturer's computer compared to that on the hacker's computer, the authorized version 2.0 is released before the unauthorized v.1.1 hacked update is available. The device installs the authorized v2.0 firmware after authenticating it with the pre-determined, immutable expected checksum value. Authorized v2.0 of the firmware, however, may optionally change the expected checksum value so that when unauthorized version 1.1 is received, it is rejected because the checksum over the image will not match the expected authorized checksum. As can be seen from the diagram, authorized versions 2.1 and 2.2 can be developed, propagated, and installed before the hacker may create and install an unauthorized firmware update due to the computational capability disparity.

So, one element of embodiments of the invention is that the forcing of checksum collisions, and changing of authorized checksum values, leverages the disparity between the processing time to create the forced checksum collisions. This is coupled with the update cycle times in a manner to allow the manufacturer to "out pace" the hacker's update cycles, staying one or more steps ahead of the hackers at all times, thus preventing an unauthorized firmware update and keeping the system closed.

Figure 2:
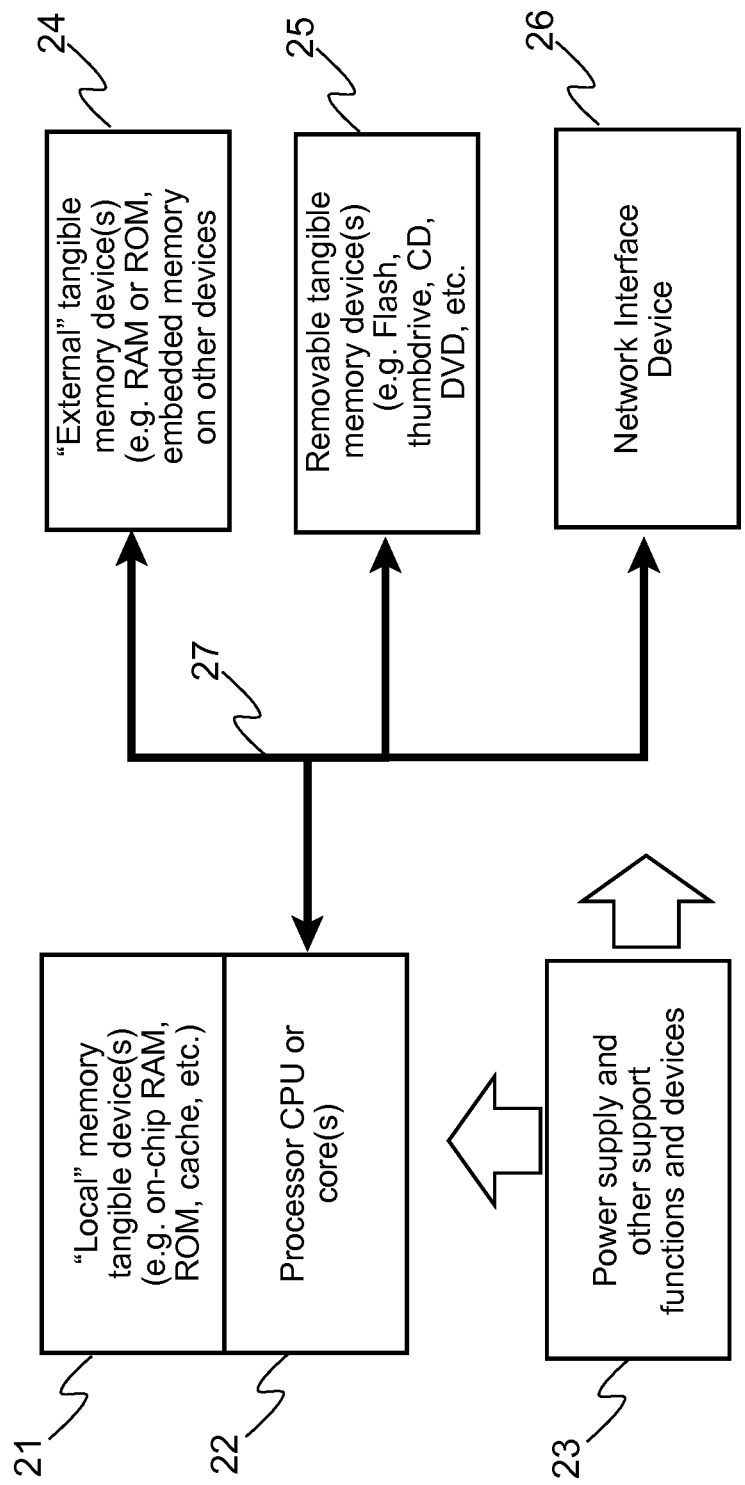
FIG. 2 illustrates the circuit components in a general sense of microprocessor based electronic systems.

Turning to FIG. 2, a generalized architecture of a consumer electronic device is shown with components relative to embodiments of the invention. One or more processors (22) provide software and firmware-controlled functions of the device, coupled to local tangible memory devices (21) such as on-chip RAM, on-chip ROM, cache memories, etc. A bus (27) interconnects the processor(s) (22) to optional external tangible memory devices (24) such as external RAM, ROM, and memory on peripherals such as graphics accelerators, caches on disk drives, etc. The bus (27) also interconnects the processor(s) (22) to one or more optional removable tangible memory devices (25) such as Flash memory cards or sticks, thumb drive devices, compact disc drives, digital versatile disc drives, etc. And, the bus (27) interconnects the processor(s) (22) to one or more network interface devices (26), such as Ethernet local areal network interfaces, wireless network interfaces, and optical data interfaces. A power supply and other support circuits, such as clock and timing sources, (23) are also typically part of such a consumer electronic device.

Firmware and software updates, upgrades or patches (or combinations of patches, upgrades and patches) may arrive to the consumer electronic device via any or all of the external tangible memory devices (24), removable tangible memory device(s) (25), and the network interface(s) (26). Embodiments of the invention encompass processes and methods which may be applied to any or all software and firmware updates and patches which are received by any or all of these sources (24, 25, 26). For example, some upgrades may be pre-stored in the consumer electronic device's memory, such as an upgrade in a cabinet or "zip" package, while other patches may be received over a communication network interface. Still others may be received at a DVD drive or USB port via a flashdrive.

Logical Processes.

Figure 3:
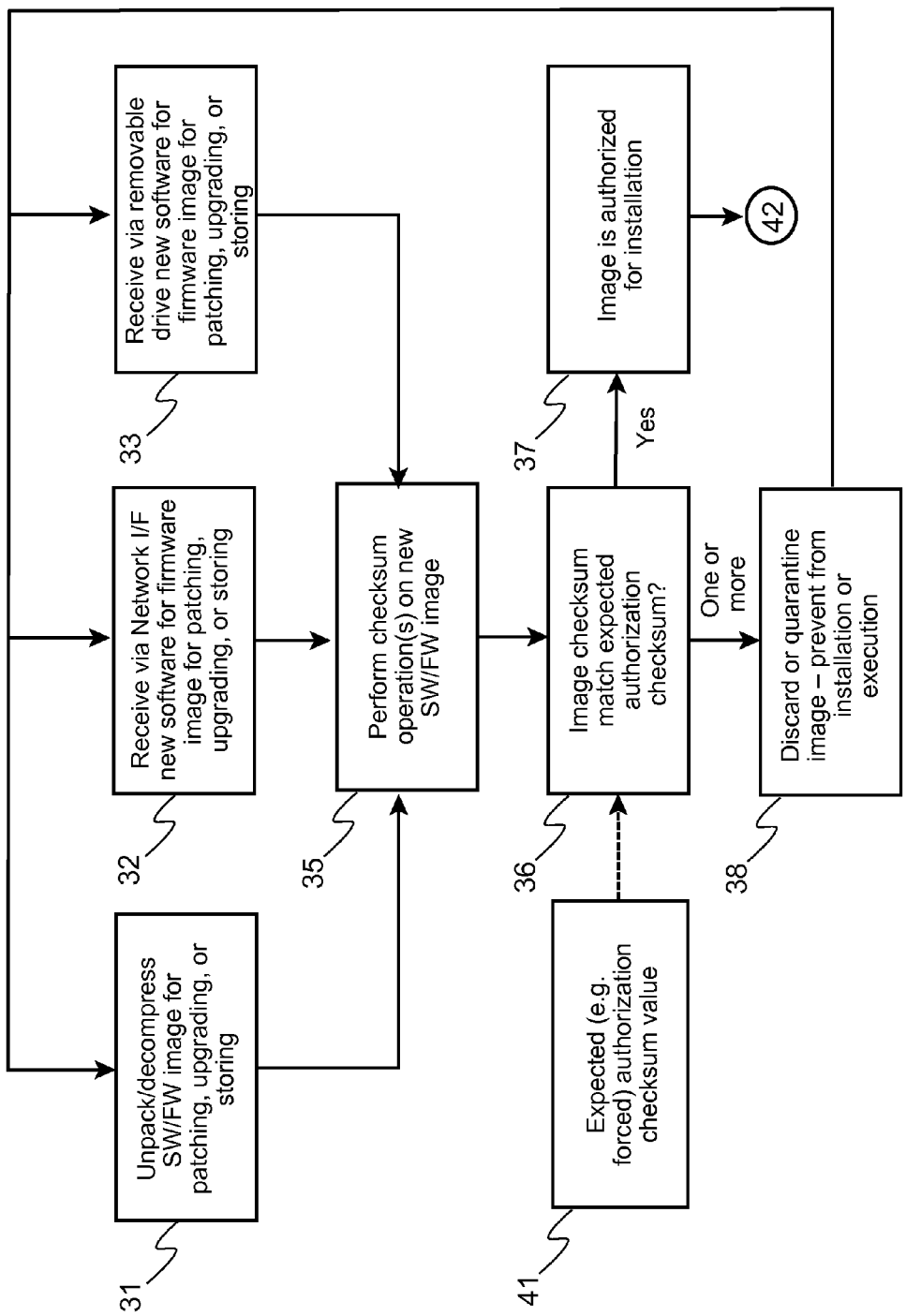
FIGS. 3 and 4 depict a logical process according to the present invention for determining by a consumer electronic device that a firmware or software upgrade or patch image is authorized before it is installed.
Figure 4:
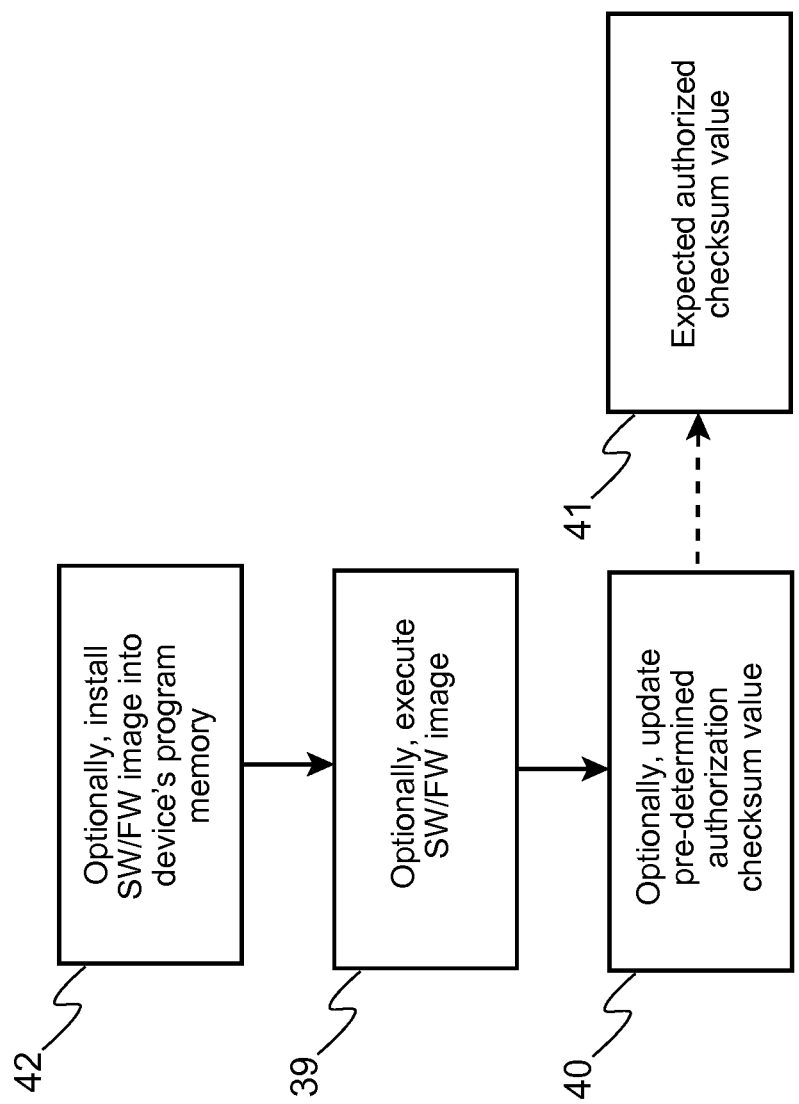

The logical process shown in FIGS. 3 and 4 may be realized by various embodiments of the invention by a combination of a processor executing software, by a custom electronic circuit device, or by both a processor executing software in cooperation with an electronic circuit.

FIG. 3 shows a logical process according to the invention in which a new software or firmware image is unpacked or decompresses (31, 32, 33) after it has been received at one of the sources (24, 25, 26). A checksum operation is performed (35) on the unpacked software or firmware image, comparing the calculated checksum to an immutable expected authorization checksum value (41) known by (e.g. stored by) the consumer electronic device. If the checksums match (36), then the software or firmware update image is error free and it is an authorized image for installation (37), so the process proceeds (42) to installation as shown in FIG. 4. However, if the checksums do not match, there is either an error in the image, or it is an unauthorized update, or both, so the image may be discarded, quarantined, or other suitable action taken to prevent its installation (38).

FIG. 4 continues the logical process by installing (42) the update image into the consumer electronic device's program memory, optionally followed by executing (39) it, and optionally updating (40) the expected authorized checksum value (41).

Figure 5:
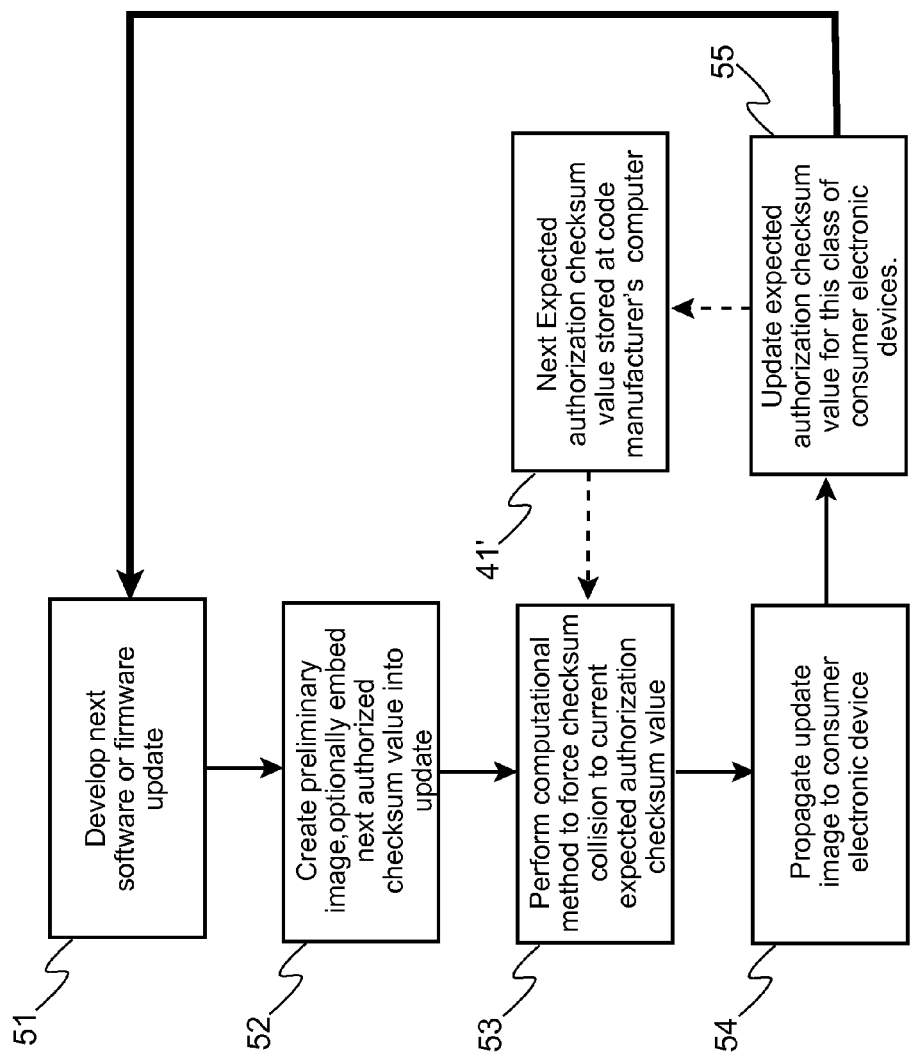
FIG. 5 shows a logical process according to the present invention for preparing by an update server an update, patch, or upgrade image to meet the authorization requirements using a forced checksum value.

FIG. 5 shows the corresponding logical process according to embodiments of the invention for the manufacturer's production of authorized updates. The next software or firmware update is developed (51), and the preliminary image of that update is then optionally modified to embed (52) the next expected authorized checksum value for a specific consumer electronic device. This is the checksum value that the device will expect in the subsequent update, not the update which is currently being prepared.

Then, the method to force a checksum collision (53) is performed over the preliminary image according to methods known in the art to force the modified image to the current expected authorized checksum value (41'), which is the same as the value (41) currently expected by the consumer electronic device. This modified image is then propagated (54) to the consumer electronic devices, where it is verified and installed as shown in FIGS. 3 and 4. Next, the manufacturer's computer optionally updates the expected authorized checksum value (41') to be equal to the value embedded into the image (52) so that the next software or firmware update can be developed (51) and forced to match (53) when that time arrives.

Example Operation.

For greater understanding of embodiments of the invention, the following brief example of operation is provided and discussed. For example, manufacturer XCorp can design a cell phone that installs firmware upgrades if and only if the checksum value of the upgrade is equal to the expected value "ebcae70c62a6c2d780f34a8dd15fea8c", which is very arbitrary value, but which is known by both the cell phone and XCorp to be the next expected authorized checksum value. Any subsequent upgrades to the firmware need to conform to that hash value (unless the expected hash value is updated with each update), so in this case, if XCorp wants to release version 1.1 upgrade, it will have to brute force the firmware binary image into conforming to a checksum value of "ebcae70c62a6c2d780f34a8dd15fea8c". The method allows choosing a hash algorithm that allows a hash collision via brute force in an acceptable amount of time by XCorp using their superior computers, but which is prohibitively complex to compute in a timely manner for hackers on their own computers. Brute forcing checksum collisions can be easy or hard depending on the hashing algorithm chosen by XCorp. An adequate hashing algorithm can be chosen from the weak CRC-8 to the strong SHA2, and everything in between.

The present invention may be used independently of the commonplace signature authorization processes, or in combination with signatures. In other words, XCorp's device can still check for a valid digital signature before performing the checksum verification on the firmware, thereby implementing multiple layers of security.

Suitable Computing Platform.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 6:
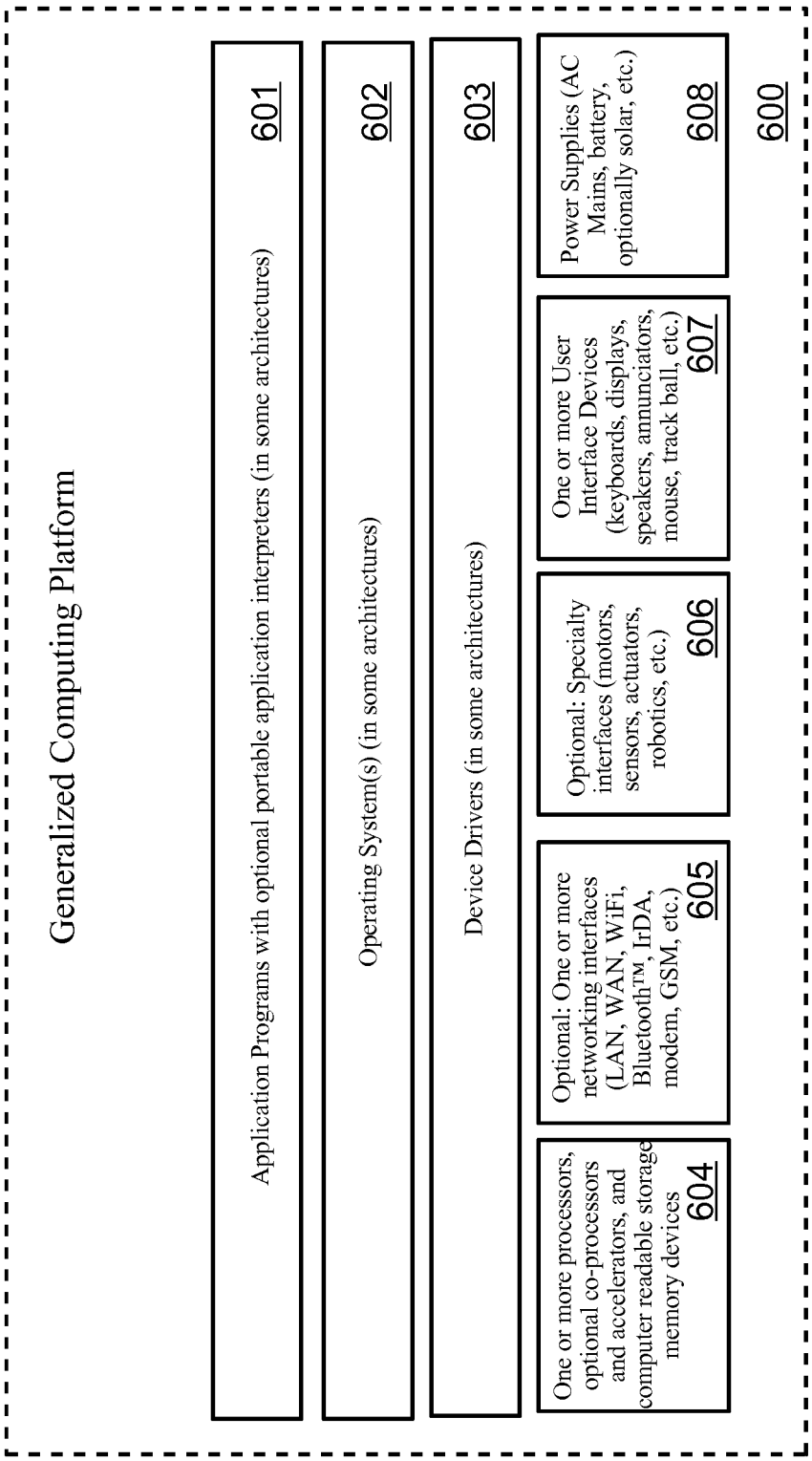
FIG. 6 illustrates the general architecture of processor-based systems including consumer electronic devices as well as server computers.

The present invention may be realized for many different processors used in many different computing platforms. FIG. 6 illustrates a generalized computing platform (600), such as common and well-known computing platforms such as "Personal Computers", web servers such as an IBM iSeries™ server, and portable devices such as personal digital assistants and smart phones, running a popular operating systems (602) such as Microsoft™ Windows™ or IBM™ AIX™, Palm OS™, Microsoft Windows Mobile™, UNIX, LINUX, Google Android™, Apple iPhone iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (601) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (604) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (605) may be provided, as well as specialty interfaces for specific applications. If the computing platform is intended to interact with human users, it is provided with one or more user interface devices (607), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for verifying the authorization of a firmware update image by a consumer electronic device comprising:
    executing by a consumer electronic device a first validated image of a firmware, software update, patch or upgrade code, which replaces a first expected authorization checksum for the currently executing image with a second expected authorization checksum in memory of the consumer electronic device, wherein the first and second expected authorization checksum values are different from each other and are specific to the consumer electronic device;
    responsive to receiving by the consumer electronic device a subsequently-created second image of an uninstalled firmware, software update, patch, or upgrade code, and prior to installation and execution of the second image, determining by the consumer electronic device a checksum value over the received second image, which is not contained in the second image;
    still prior to installation and execution of the received second image, comparing by the consumer electronic device the determined checksum to the second expected authorization checksum value previously stored in the memory of the consumer electronic device by the executing of the first image;
    responsive to the comparing finding a match, installing by the consumer electronic device the second received image into the consumer electronic device; and
    responsive to the comparison finding a mismatch, prohibiting by the consumer electronic device installing of the second received image into the consumer electronic device.

2. The method as set forth in claim 1 further comprising executing by the consumer electronic device the second installed image of firmware or software update, patch, or upgrade, which replaces the second expected authorization checksum with a third expected authorization checksum in memory of the consumer electronic device.

3. The method as set forth in claim 1 wherein the determining further comprises validating with an authorized digital signature the image of the uninstalled firmware or software update, patch, or upgrade; wherein the comparing further comprises determining that the validating was successful; and wherein the installing is further responsive to the successful unsigning of the image.

4. A computer program product for verifying the authorization of a firmware update image by a consumer electronic device comprising:
    one or more tangible computer memory devices;
    program instructions embodied by the one or more tangible computer memory devices for causing a processor of by a consumer electronic device to perform the operations of:
        executing a first validated image of a firmware, software update, patch or upgrade code, which replaces a first expected authorization checksum for the currently executing image with a second expected authorization checksum in memory of the consumer electronic device, wherein the first and second expected authorization checksum values are different from each other and are specific to the consumer electronic device;
        responsive to receiving a subsequently-created second image of an uninstalled firmware, software update, patch, or upgrade code, and prior to installation and execution of the second image, determining a checksum value over the received second image, which is not contained in the second image;
        still prior to installation and execution of the received second image, comparing the determined checksum to the second expected authorization checksum value previously stored in the memory of the consumer electronic device by the executing of the first image;
        responsive to the comparing finding a match, installing the second received image into the consumer electronic device; and
        responsive to the comparison finding a mismatch, prohibiting installing of the second received image into the consumer electronic device.

5. The computer program product as set forth in claim 4 wherein the program instructions further comprise program instructions to cause execution of the second image, which replaces the second expected authorization checksum with a third expected authorization checksum in memory of the consumer electronic device.

6. The computer program product as set forth in claim 4 wherein the determining further comprises validating with an authorized digital signature the image of the uninstalled firmware or software update, patch, or upgrade; wherein the comparing further comprises determining that the validating was successful; and wherein the installing is further responsive to the successful validating of the image.

7. A system for verifying the authorization of a firmware update image by a consumer electronic device comprising:
- a consumer electronic device having a logical processor and one or more tangible computer memory devices;
- program instructions embodied by the one or more tangible computer memory devices for causing the logical processor to perform the operations of:
  - executing a first validated image of a firmware, software update, patch or upgrade code, which replaces a first expected authorization checksum for the currently executing image with a second expected authorization checksum in memory of the consumer electronic device, wherein the first and second expected authorization checksum values are different from each other and are specific to the consumer electronic device;
  - responsive to receiving a subsequently-created second image of an uninstalled firmware, software update, patch, or upgrade code, and prior to installation and execution of the second image, determining a checksum value over the received second image, which is not contained in the second image;
  - still prior to installation and execution of the received second image, comparing the determined checksum to the second expected authorization checksum value previously stored in the memory of the consumer electronic device by the executing of the first image;
  - responsive to the comparing finding a match, installing the second received image into the consumer electronic device; and
  - responsive to the comparison finding a mismatch, prohibiting installing of the second received image into the consumer electronic device.

8. The system as set forth in claim 7 wherein the program instructions further comprise program instructions to cause execution of the second image, which replaces the second expected authorization checksum with a third expected authorization checksum in memory of the consumer electronic device.

9. The system as set forth in claim 7 wherein the determining further comprises validating with an authorized digital signature the image of the uninstalled firmware or software update, patch, or upgrade; wherein the comparing further comprises determining that the validating was successful; and wherein the installing is further responsive to the successful validating of the image.

* * * * *